United States Patent
Neisen et al.

(10) Patent No.: US 11,866,888 B2
(45) Date of Patent: Jan. 9, 2024

(54) MATERIAL TRANSFER VEHICLE WITH GROUND OPERATOR STATION

(71) Applicant: Roadtec, Inc., Chattanooga, TN (US)

(72) Inventors: Matthew Neisen, Soddy Daisy, TN (US); Nathan Beckman, Chattanooga, TN (US)

(73) Assignee: Roadtec, Inc., Chattanooga, TN (US)

( * ) Notice: Subject to any disclaimer, the term of this patent is extended or adjusted under 35 U.S.C. 154(b) by 708 days.

(21) Appl. No.: 16/991,476

(22) Filed: Aug. 12, 2020

(65) Prior Publication Data

US 2021/0054580 A1    Feb. 25, 2021

Related U.S. Application Data

(60) Provisional application No. 62/941,059, filed on Nov. 27, 2019, provisional application No. 62/890,829, filed on Aug. 23, 2019.

(51) Int. Cl.
| | |
|---|---|
| *E01C 19/20* | (2006.01) |
| *B62D 51/02* | (2006.01) |
| *B60N 2/66* | (2006.01) |
| *B62D 51/00* | (2006.01) |

(52) U.S. Cl.
CPC ............. *E01C 19/20* (2013.01); *B60N 2/66* (2013.01); *B62D 51/001* (2013.01); *B62D 51/02* (2013.01); *E01C 2019/2075* (2013.01); *E01C 2301/40* (2013.01)

(58) Field of Classification Search
CPC ............ E01C 19/20; E01C 2019/2075; E01C 2301/40; B62D 51/001; B62D 51/02; B60N 2/66

USPC .......................................... 404/82, 101–110
See application file for complete search history.

(56) References Cited

U.S. PATENT DOCUMENTS

| | | | |
|---|---|---|---|
| 4,505,356 A * | 3/1985 | Baier | G05G 7/04 180/326 |
| 4,765,772 A | 8/1988 | Benedetti et al. | |
| 5,015,120 A * | 5/1991 | Brock | B60P 1/38 414/528 |
| 5,035,534 A | 7/1991 | Brock et al. | |
| 5,470,175 A | 11/1995 | Jensen et al. | |
| 5,533,829 A | 7/1996 | Campbell | |

(Continued)

FOREIGN PATENT DOCUMENTS

| | | |
|---|---|---|
| CA | 3147777 A1 | 3/2021 |
| WO | 9610114 A1 | 4/1996 |

OTHER PUBLICATIONS

International Search Report of counterpart PCT Application No. PCT/US2020/045899, filed Aug. 12, 2020.

(Continued)

*Primary Examiner* — Raymond W Addie
(74) *Attorney, Agent, or Firm* — Chambliss, Bahner & Stophel, P.C.; Stephen D. Adams

(57) ABSTRACT

A material transfer vehicle includes a material-receiving device that is adapted to receive asphalt paving material, and a loading conveyor that is operatively connected to the material-receiving device and adapted to receive asphalt paving material from the material-receiving device. A ground operator's station is located adjacent to the material-receiving device. The ground operator's station includes a lower platform on which the ground operator may stand, and a seat on which the ground operator may sit.

8 Claims, 7 Drawing Sheets

(56) References Cited

U.S. PATENT DOCUMENTS

| | | | | |
|---|---|---|---|---|
| 6,213,680 B1* | 4/2001 | Schaeffer | ................ | E01C 19/47 |
| | | | | 404/93 |
| 6,345,932 B1* | 2/2002 | Fix | ......................... | B62D 12/00 |
| | | | | 280/468 |
| 7,134,806 B2* | 11/2006 | Lazic | ...................... | E01C 23/06 |
| | | | | 404/101 |
| 7,160,056 B1* | 1/2007 | Hoffmann | ............... | E01C 19/48 |
| | | | | 404/110 |
| 10,046,798 B2* | 8/2018 | Reeves | ................. | B62D 37/00 |
| 2003/0010600 A1* | 1/2003 | Speers | ................. | B65G 41/008 |
| | | | | 198/300 |
| 2004/0208699 A1 | 10/2004 | Grubba | | |
| 2006/0266853 A1* | 11/2006 | Gamble, II | ......... | A01C 15/006 |
| | | | | 239/681 |
| 2018/0105116 A1 | 4/2018 | Neisen | | |

OTHER PUBLICATIONS

"Material Transfer Vehicles," Roadtec, 2006 (retrieved on Oct. 20, 2020 at https://oregontechsfstatic.azureedge.net/sitefinity-production/programs- . . . , p. 12, paragraph 3.

Extended European Search Report for EP application No. 20857737.9, dated Aug. 17, 2023, 8 pages.

* cited by examiner

MATERIAL TRANSFER VEHICLE WITH GROUND OPERATOR STATION

CROSS-REFERENCE TO RELATED APPLICATIONS

This application claims the benefit of U.S. Provisional Patent Application No. 62/890,829, which was filed on Aug. 23, 2019, and of U.S. Provisional Patent Application No. 62/941,059, which was filed on Nov. 27, 2019.

FIELD OF THE INVENTION

This invention relates generally to material transfer vehicles, and more particularly, to a material transfer vehicle that employs a ground operator.

BACKGROUND OF THE INVENTION

Asphalt paving material is comprised of an asphaltic binder and aggregates of various particle sizes, including both coarse and fine aggregate materials. Because the equipment needed to produce asphalt paving material is expensive and the space required extensive, asphalt paving material is typically produced in a production facility that is dedicated to such purpose. Consequently, it is frequently necessary to transport the asphalt paving material from its place of origin to an asphalt paving machine at a remote paving site. The asphalt paving material is usually transported in dump trucks to an asphalt paving machine or to a material transfer vehicle that completes the transfer to the asphalt paving machine.

An asphalt paving machine is a self-propelled vehicle that is driven by a wheeled or tracked drive system. In a common type of paving machine, an asphalt receiving hopper is located at the front end of the machine to receive asphalt paving material, and a slat-type hopper conveyor located below the asphalt receiving hopper transfers the asphalt paving material from the hopper to a distribution assembly comprising a transverse distributing auger that is mounted at the rear of the machine. The asphalt paving material is deposited onto and across the roadway or other surface to be paved by the distributing auger, and a floating screed located behind the distributing auger compacts the asphalt paving material to form an asphalt mat.

Sometimes, asphalt paving material is discharged directly from a delivery truck into the asphalt receiving hopper of the asphalt paving machine. A dump-type delivery truck is unloaded by raising the truck bed and allowing the asphalt paving material to slide down the bed into the receiving hopper. When the truck bed is raised, it should not come into contact with the receiving hopper and should not be carried by or ride on any portion of the paving machine. For smaller-capacity dump trucks, contact with the paver is not often a problem. However, such contact can be a problem when large tractor-semitrailer units are used as delivery vehicles, particularly when the truck bed is extended to its highest point. In addition, if a delivery truck contacts the paver so that a portion of the weight of the delivery truck is carried by the paver as the paving operation is carried out, the screed elevation may be changed, which will affect the smoothness of the finished asphalt mat.

When asphalt paving material is delivered to the paving machine by delivery trucks, it is frequently necessary for a series of delivery trucks to move into contact with the front end of the paving machine to serially discharge their loads into the paving machine's asphalt receiving hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). In addition, because a typical delivery truck carries more asphalt paving material than can be unloaded quickly into the receiving hopper of the asphalt paving machine, it is frequently necessary for the paving machine to push the truck in the paving direction as the truck is unloaded while paving proceeds. This may be difficult to manage when the paving machine is proceeding through intersections or operating on curved sections of the roadway. Furthermore, the ability of the paving machine operator to place a smooth mat on the roadway will be affected by the rate of feed of asphalt paving material to the paving machine. This requires planning for proper scheduling of delivery trucks and coordination with the asphalt production facility. However delays at the production facility or traffic encountered by the delivery trucks can thwart the efforts of the most careful planners. Consequently, because it is desirable to keep the paving machine moving at all times during an asphalt paving operation, and since delivery trucks must be unloaded as they are pushed along in the paving direction, it is frequently necessary to have delivery trucks queue up near the paving machine to ensure that a loaded truck is available to move quickly into unloading position as an unloaded truck is moved out of the way. This may result in heat losses in the asphalt paving material in the waiting trucks, which can affect the quality of the asphalt mat being created by the paving machine.

A delivery truck can also be used to deliver the asphalt paving material to a windrow on the roadway in front of the paver. If the delivery truck is a dump truck, the windrow is usually formed by a spreader box or a windrow blending unit. If a spreader box is used, it will be pulled behind the truck, and the truck bed raised to deposit the asphalt paving material into the box. As the truck moves forward, the asphalt paving material is uniformly metered out of the box onto the roadway. If a windrow blending unit is used, it will typically be attached to a small front-end loader, and the asphalt paving material dumped onto the existing roadway across the width of the truck bed. The windrow blending unit will fold the asphalt paving material into a windrow as the blending unit is pushed forward by the loader. A bottom-unloading truck may also be used to deposit asphalt paving material in the form of a windrow onto the roadway.

When asphalt paving material is deposited on the roadway in the form of a windrow, it may be picked up from the roadway surface by a windrow elevator that is attached to the front of the asphalt paving machine. However, because it is desirable to keep the paving machine moving at all times while the paving machine is being operated, the windrow method of delivery may still require delivery trucks queueing up near the paving machine to insure that a windrow of asphalt paving material is available as soon as it is needed by the paving machine. This may also result in heat losses in the asphalt paving material in the waiting windrows, which can affect the quality of the asphalt mat being created by the paving machine.

For all of the difficulties associated with the timely delivery of asphalt paving material by individual delivery trucks to a paving machine or in the form of windrows, material transfer vehicles have been used in recent years to transport asphalt paving material to an asphalt paving machine. A material transfer vehicle may be used to shuttle asphalt paving material between the delivery trucks and the asphalt paving machine. Another type of material transfer vehicle is equipped with a windrow pick-up head that can pick up a windrow of asphalt paving material that has been dumped on the roadway as the material transfer vehicle is moved into the windrow.

These vehicles are adapted to move alongside an asphalt paving machine and transfer the asphalt paving material received from the trucks or the windrows into the receiving hopper of the asphalt paving machine. Still another type of material transfer vehicle is adapted to move alongside the asphalt paving machine while being tethered to a delivery truck to allow for the transfer of asphalt paving material from a delivery truck to an asphalt paving machine without requiring either the delivery truck or the material transfer vehicle to make direct contact with the asphalt paving machine, thus reducing the time required for delivery truck maneuvers and reducing the risk that the paving machine will have to stop during the paving operation.

Self-propelled material transfer vehicles typically include a material-receiving device comprising a truck-receiving hopper or a window pick-up head, and an inclined loading conveyor extending upwardly from the hopper or pick-up head. A transversely oriented auger in the truck-receiving hopper or windrow pick-up head may be provided to urge asphalt paving material onto the loading conveyor. The asphalt paving material is carried upwardly by the loading conveyor from the truck-receiving hopper or pick-up head and discharged off the elevated output end of the loading conveyor through a chute over the lower end of a discharge conveyor, or into an intermediate surge bin that is sized to hold the entire load of a delivery truck. The discharge of asphalt paving material off the elevated output end of the loading conveyor so that it may fall under the influence of gravity into a surge bin or directly onto the discharge conveyor assists in preventing undesirable segregation of the various particulate components of the asphalt paving material by particle size.

Material transfer vehicles of the type that are equipped with a surge bin typically include an auger and a conveyor in the surge bin that are adapted to transfer the asphalt paving material to the discharge conveyor. The auger in the surge bin re-blends the asphalt paving material to eliminate particle size segregation that occurs as the material is transported. It also helps to keep the heat in the asphalt paving material evenly distributed throughout the entire load of material obtained from the delivery truck or windrow.

Discharge conveyors that are mounted on self-propelled material transfer vehicles with and without surge bins are generally pivotable about a substantially vertical axis so that the transfer vehicle can be positioned alongside an asphalt paving machine that is laying an asphalt mat and rapidly discharge asphalt paving material into the hopper of the paving machine as the material transfer vehicle moves with the paving machine along the roadway. Furthermore, these discharge conveyors are configured so that their discharge end may be raised and lowered to position the discharge outlet advantageously with respect to the asphalt receiving hopper of a paving machine. The moveable nature of these discharge conveyors allows for some flexibility in locating the material transfer vehicle adjacent to the asphalt paving machine. Because of its rapid loading and unloading capabilities, a self-propelled material transfer vehicle equipped with a surge bin can rapidly shuttle between delivery trucks or windrows at a pick-up point and an asphalt paving machine that is laying an asphalt mat at a paving site so that there is less likelihood that the paving machine will have to stop paving because of a lack of asphalt paving material.

When a self-propelled material transfer vehicle is used in an asphalt paving process, a delivery truck can be stopped a significant distance away from the paving machine in order to unload its load from a stopped position into the material transfer vehicle or onto the roadway in the form of a windrow. Thus, the delivery truck can unload faster when not unloading directly into the paving machine, and the unloading location may be selected so that there is no danger of the raised dump bed of the truck hitting power lines or tree limbs on the side of the roadway. The use of a material transfer vehicle also reduces the need for delivery trucks to queue up at the paving machine in order to keep it moving, thereby cutting the waiting time of the delivery trucks and thereby reducing truck operating costs.

Most paving crews operating a material transfer vehicle will employ two operators. A primary operator will sit in the operator's station atop the material transfer vehicle and will be responsible for driving the vehicle and positioning the vehicle with respect to the delivery trucks or windrows and the asphalt paving machine. The primary operator will also control the elevation and location of the discharge conveyor over the paving machine. A secondary operator (or ground operator) typically walks alongside the truck-unloading hopper to monitor the flow of asphalt paving material from the delivery truck or windrow and to communicate with the delivery truck driver. Typically, the ground operator will have access to a control panel that controls the operation of the loading conveyor. However, by walking alongside the material transfer vehicle as it receives asphalt paving material from a delivery truck or windrow, the ground operator is exposed to several hazards. Sometimes it is necessary for the ground operator to walk on an unstable, unfinished edge of the roadway. At other times, it is necessary for the ground operator to walk on the edge of an active lane of traffic. Furthermore, since there is no ground operator's station on a conventional material transfer vehicle, it is necessary for the ground operator to walk or at least to stand for his entire work shift. It would be desirable if an operator's station could be provided for the ground operator that would position him so that he could perform his necessary duties more safely than is possible in a conventional material transfer vehicle. It would also be desirable if such an operator's station could be provided that would allow the ground operator to get off his feet for a period of time during the paving operation. It would also be preferable to locate the ground operator's station within the outer periphery of the material transfer vehicle.

Advantages of the Invention

Among the advantages of the invention is that it provides a material transfer vehicle that includes a ground operator's station that positions the ground operator in a safe place with respect to the material transfer vehicle and the roadway, yet allows him to perform all the necessary functions of his job. Another advantage of the invention is that it provides such a ground operator's station that provides the ground operator with a clear and unobstructed view of the bed of the delivery truck, the truck-receiving hopper or windrow pick-up head, and the truck-unloading conveyor. Still another advantage of the invention is that it provides such a ground operator's station that allows the ground operator to get off his feet for a period of time during the paving operation. Still another advantage of a preferred embodiment of the invention is that it locates the ground operator's station in a recess adjacent to the loading conveyor and behind the material-receiving device that is within the outer periphery of the material transfer vehicle. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The terms "operatively attached" and "operatively connected" describe such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "asphalt paving material" refers to a bituminous paving mixture that is comprised of asphalt cement and crushed stone, recycled asphalt shingles, recycled asphalt pavement materials and/or other aggregate materials of varying particle size, and which is used for paving purposes.

The terms "asphalt paving machine", "paving machine" and "paver" refer to a finishing machine for applying asphalt paving material to form an asphalt mat on a roadway, parking lot or similar surface. An asphalt paving machine or paver is typically a self-propelled vehicle having a hopper at one end for receiving asphalt paving material, a distributing auger for distributing asphalt paving material across the roadway at the other end, and a floating screed located behind the distributing auger for forming an asphalt mat on the roadway. A conveyor is also provided to move asphalt paving material from the hopper to the distributing auger.

The term "asphalt mat" refers to a layer of asphalt paving material such as is applied by an asphalt paving machine to produce a roadway, parking lot or similar surface.

The term "material transfer vehicle" refers to a self-propelled vehicle that is adapted to receive asphalt paving material from a delivery truck or a windrow and to transfer the asphalt paving material to the receiving hopper of an asphalt paving machine.

SUMMARY OF THE INVENTION

The invention comprises a material transfer vehicle having a ground operator's station that positions the ground operator in a safe place with respect to the material transfer vehicle and the roadway, yet allows him to perform all the necessary functions of his job. This ground operator's station includes a lower platform and a seat that is preferably located directly across from a ground operator's control panel. Preferably, the control panel can pivot or swing from a first position in which it can be accessed by a ground operator in the ground operator's station to a second position in which it can be accessed by a ground operator walking alongside the material-receiving device of the material transfer vehicle. Preferably, the ground operator can stand on the lower platform or sit on the seat and access the control panel when it is in the first position. In a preferred embodiment of the invention, the ground operator's station is located in a recess adjacent to the loading conveyor and behind the material-receiving device within the outer periphery of the material transfer vehicle.

In order to facilitate an understanding of the invention, the preferred embodiments of the invention, as well as the best mode known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described and claimed herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

Figure 1:
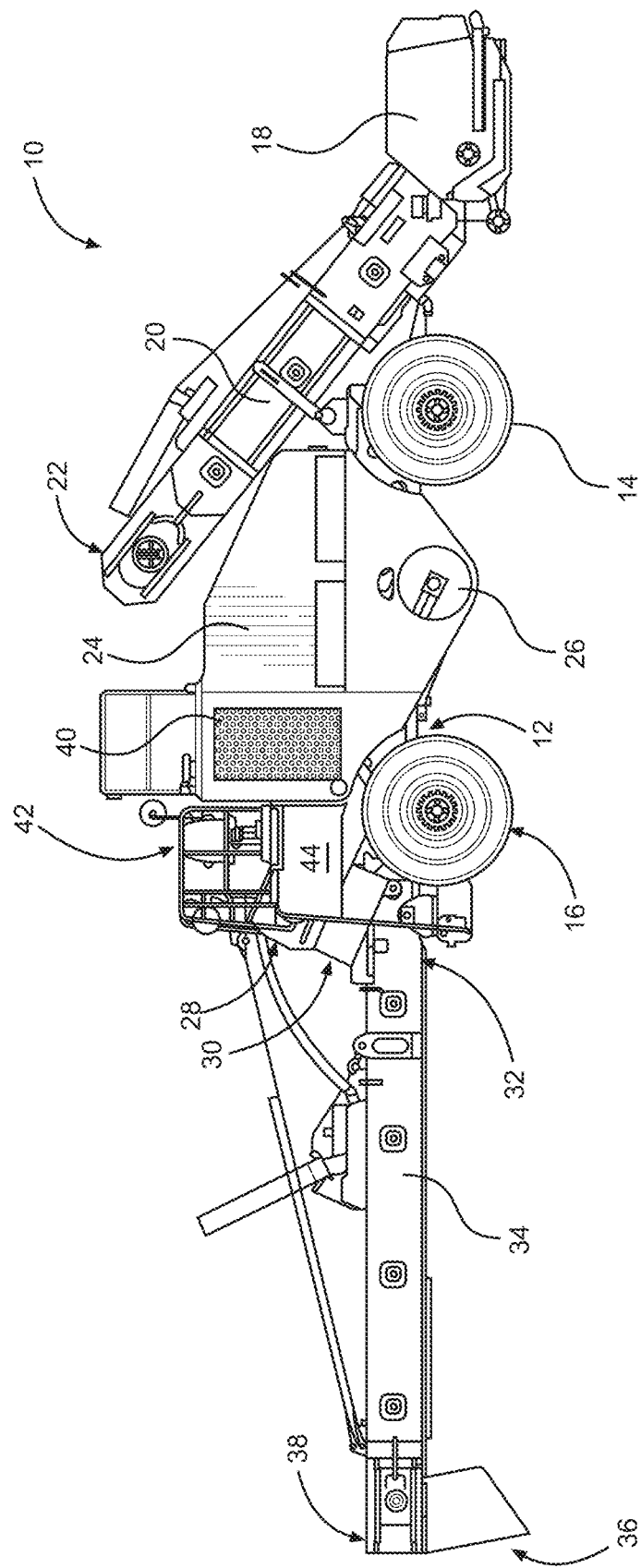
FIG. 1 is a side view of a first embodiment of a conventional material transfer vehicle of a type that may be constructed according to the invention.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, a conventional self-propelled material transfer vehicle 10 includes a frame 12 that is supported on the roadway surface by first wheel set 14 and second wheel set 16. Each of the wheel sets is driven by a hydraulic motor (not shown) that is supplied with fluid under pressure by one or more hydraulic pumps (also not shown). Vehicle 10 includes truck-receiving hopper 18 for receiving asphalt paving material from a delivery truck (not shown), although it could alternatively be equipped with a material-receiving device comprising a windrow pick-up head. An auger (not shown) is mounted in truck-receiving hopper 18 and is adapted to assist in conveying asphalt paving material from truck-receiving hopper 18 into loading conveyor 20, which in turn conveys the asphalt paving material off of its output end 22 and into surge bin 24. The surge bin includes transverse auger 26 that is employed to mix the asphalt paving material in the surge bin in order to minimize segregation or separation of the aggregate portion of the asphalt paving material by size. Also located in the surge bin is surge conveyor 28, which is adapted to convey asphalt paving material upwardly out of the surge bin so that it may fall through chute 30 which is located over input end 32 of discharge conveyor 34. Discharge conveyor 34 is mounted for vertical pivotal movement about a pivot axis at its input end that is perpendicular to the page on which FIG. 1 is displayed, as raised and lowered by a linear actuator (not shown). Discharge conveyor 34 is also adapted for side-to-side movement about a vertical axis by operation of one or more additional actuators (also not shown). Asphalt paving material that falls through chute 30 onto discharge conveyor 34 is discharged through chute 36 at conveyor output end 38 into an asphalt receiving hopper of an asphalt paving machine (not shown). Hydraulic drive systems including hydraulic pumps and hydraulic motors are provided to drive the various augers and conveyors. An engine (not shown, but located within engine compartment 40) provides the motive force for the hydraulic pumps that drive the hydraulic motors for the wheel sets, the augers and the various conveyors and other components of the vehicle. Primary operator's station 42 is located above fuel tank 44 in a location that provides the primary operator with an unobstructed view towards output end 38 of discharge conveyor 34.

Figure 2:
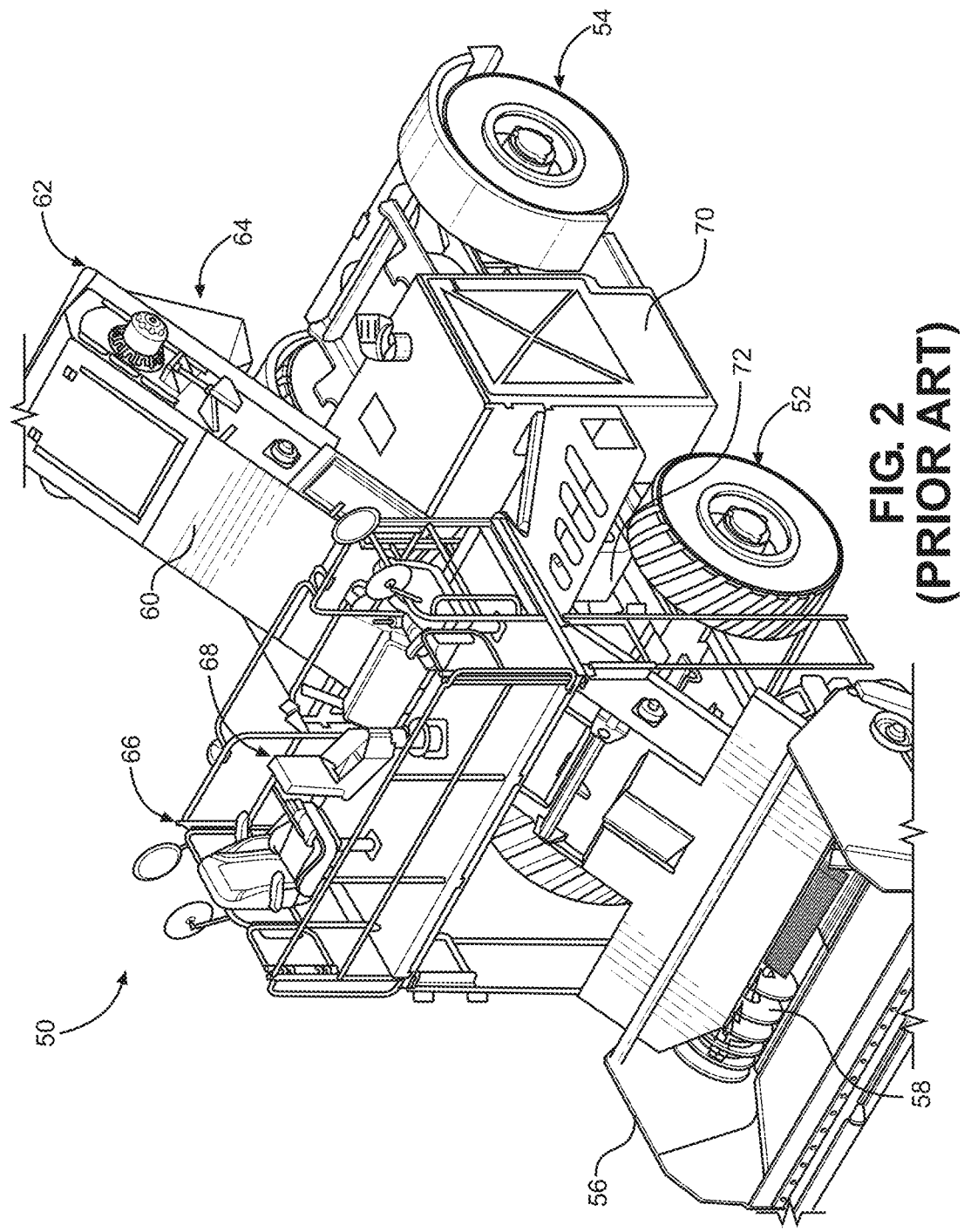
FIG. 2 is a perspective view of a portion of a second embodiment of a conventional material transfer vehicle of a type that may be constructed according to the invention.

FIG. 2 illustrates an alternative conventional material transfer vehicle 50 which includes a frame that is supported on the roadway surface by first wheel set 52 and second wheel set 54.

Each of the wheel sets is driven by a hydraulic motor (not shown) that is supplied with fluid under pressure by one or more hydraulic pumps (also not shown). Vehicle 50 includes truck-receiving hopper 56 for receiving asphalt paving material from a delivery truck (not shown). Auger 58 in truck-receiving hopper 56 is adapted to urge asphalt paving material into loading conveyor 60. Loading conveyor 60 is operatively attached to the truck-receiving hopper and is adapted to convey asphalt paving material from truck-receiving hopper 56 upwardly to its output end 62, from which it will fall through chute 64 onto the lower input end of a discharge conveyor (not shown, but substantially similar to discharge conveyor 34). Material transfer vehicle 50 also includes primary operator's station 66 from which the primary operating functions of the vehicle may be controlled via control panel 68. The primary operator's station provides the primary operator with an unobstructed view towards the output end of the discharge conveyor. Material transfer vehicle 50 includes various hydraulic pumps and hydraulic motors, which are provided to drive the various augers and conveyors. An engine (not shown, but located in engine compartment 70) provides the motive force for the hydraulic pumps that drive the hydraulic motors for the wheel sets, the augers, the conveyors and the other components of the vehicle. A fuel tank (not shown) is located on the opposite side of engine compartment 70 from hydraulic fluid tank 72 below loading conveyor 60.

Figure 3:
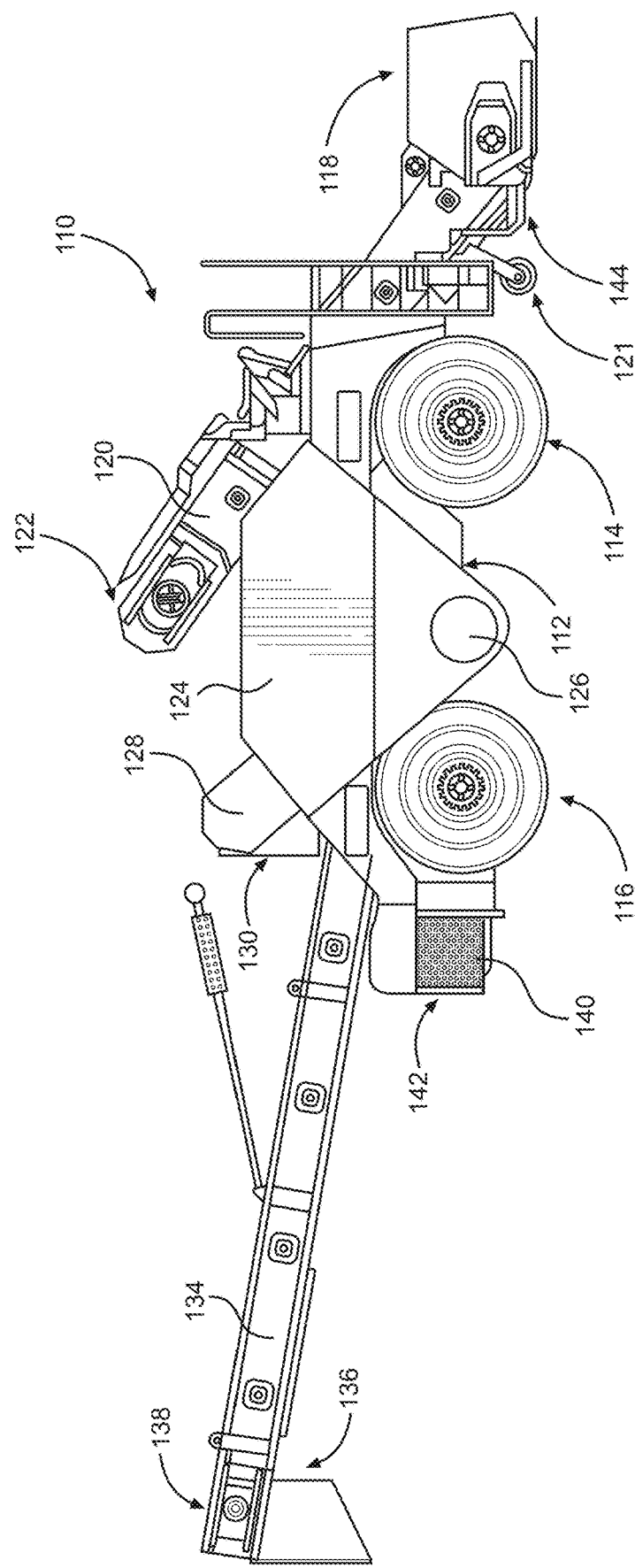
FIG. 3 is a side view of a portion of a material transfer vehicle similar to that shown in FIG. 1 that has been provided with a ground operator's station according to the invention.
Figure 4:
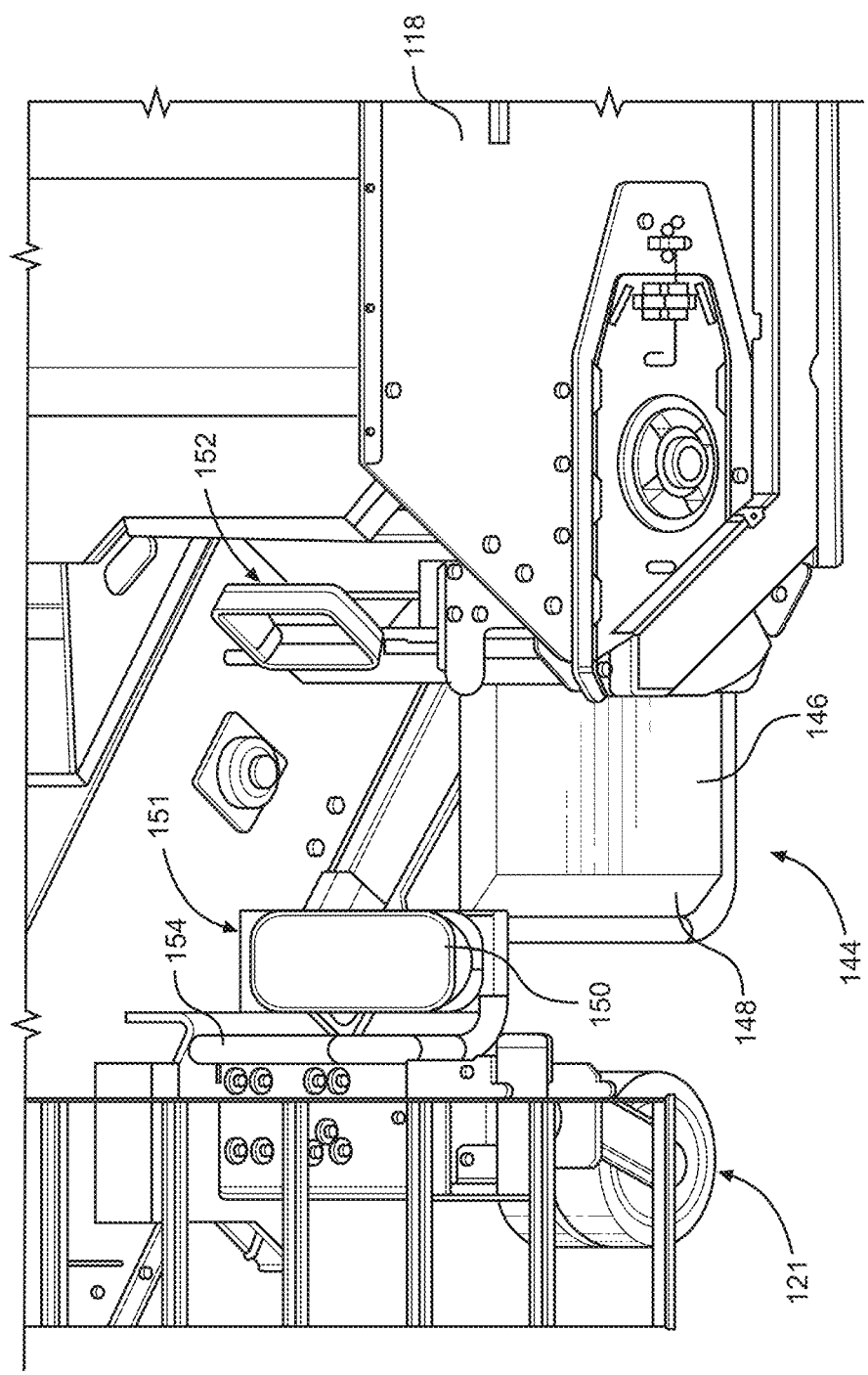
FIG. 4 is a perspective view of a portion of the material transfer vehicle shown in FIG. 3, showing the ground operator's station.
Figure 5:
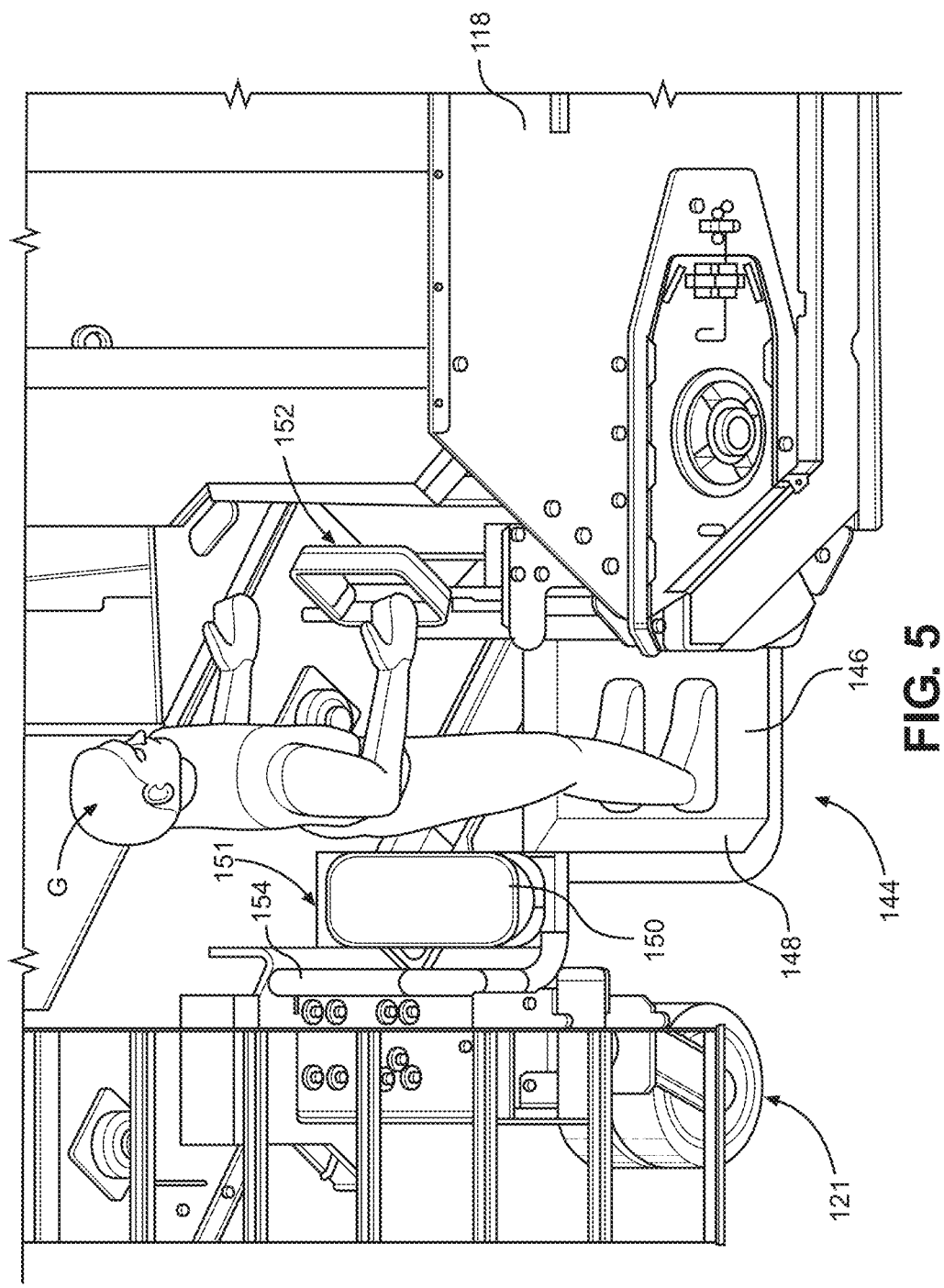
FIG. 5 is a view of the portion of the material transfer vehicle shown in FIG. 4, except that it shows a ground operator in a standing position at the ground operator's station.
Figure 6:
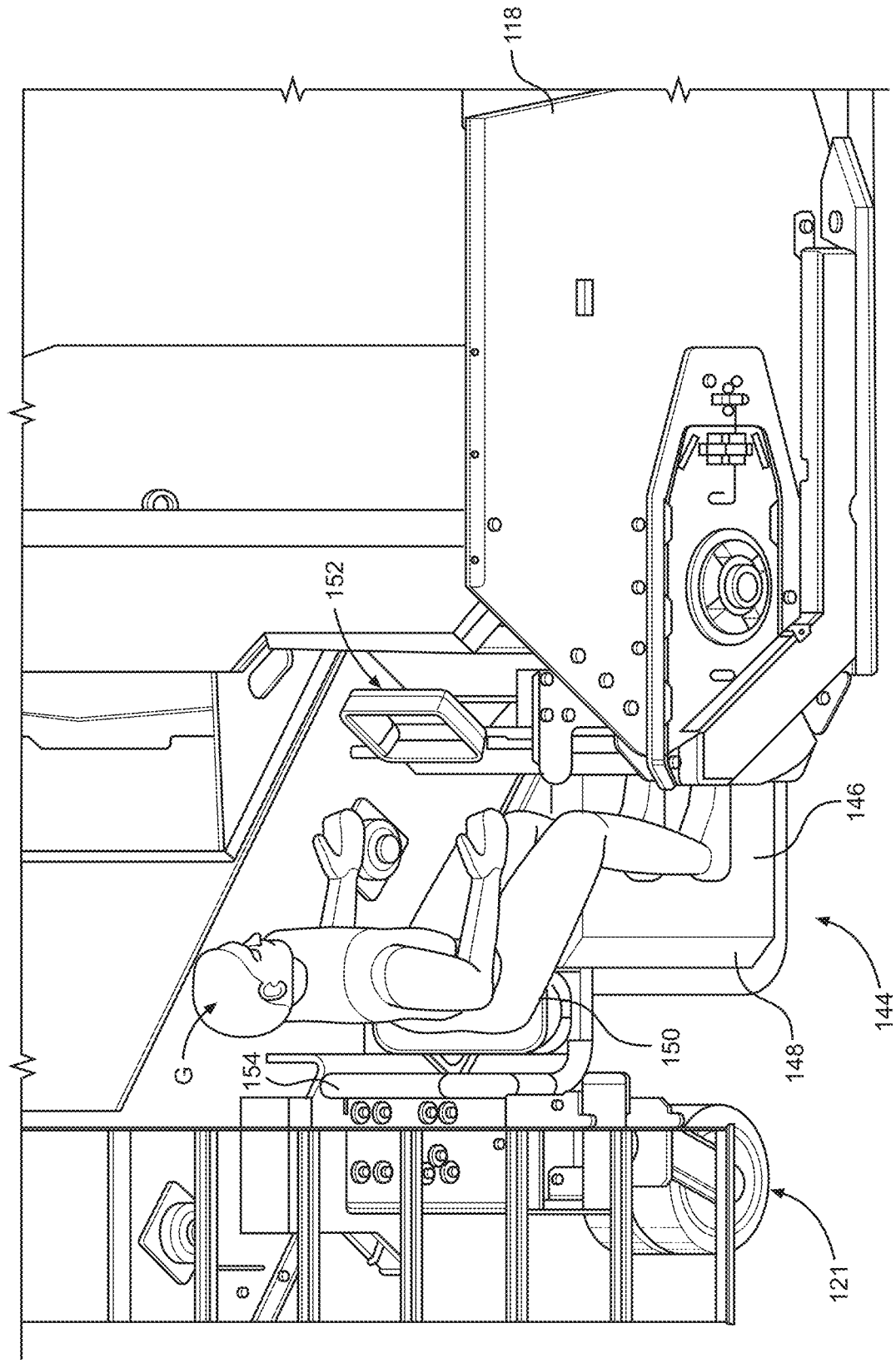
FIG. 6 is a view of the portion of the material transfer vehicle that is shown in FIGS. 4 and 5, except that it shows a ground operator in a seated position at the ground operator's station.
Figure 7:
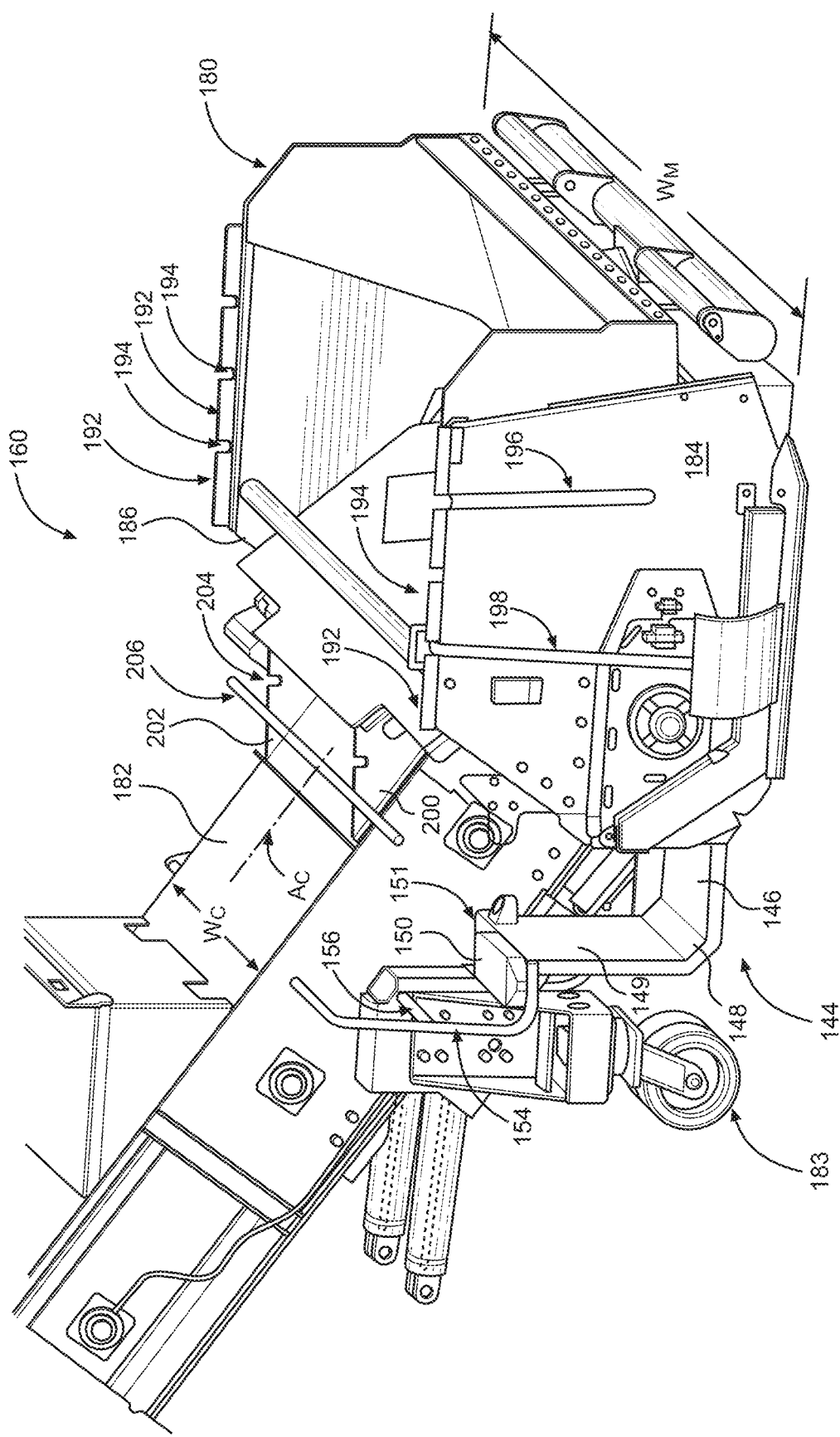
FIG. 7 is a perspective view of the truck-receiving hopper of a material transfer vehicle similar to that shown in FIGS. 3-6, illustrating an additional feature of a preferred embodiment of the invention.

FIGS. 3-6 illustrate a first embodiment of the invention, and FIG. 7 illustrates a second embodiment. As shown in FIGS. 3-6, material transfer vehicle 110 includes a frame 112 that is supported on the roadway surface by first wheel set 114 and second wheel set 116. Each of the wheel sets is driven by a hydraulic motor (not shown) that is supplied with fluid under pressure by one or more hydraulic pumps (also not shown). Vehicle 110 includes a material-receiving device comprising truck-receiving hopper 118 for receiving asphalt paving material from a delivery truck (not shown). Other material transfer vehicles (not shown) may include another type of material-receiving device such as a windrow pick-up head (not shown) instead of the truck-receiving hopper. An auger (not shown, but substantially similar to auger 58) is mounted in the truck-receiving hopper and is adapted to assist in conveying asphalt paving material from the truck-receiving hopper into loading conveyor 120, which is supported at its lower end by a pair of wheel sets, one of which, wheel set 121, is shown in FIGS. 3-6. Loading conveyor 120 conveys the asphalt paving material off of its output end 122 and into surge bin 124. The surge bin includes transverse auger 126 that is employed to mix the asphalt paving material in the surge bin in order to minimize segregation or separation of the aggregate portion of the asphalt paving material by size. Also located in the surge bin is surge conveyor 128, which is adapted to convey asphalt paving material upwardly out of the surge bin so that it may fall through chute 130 which is located over the input end of discharge conveyor 134. Discharge conveyor 134 is mounted for vertical pivotal movement about a pivot axis at its input end that is perpendicular to the page on which FIG. 3 is displayed, as raised and lowered by a linear actuator. Discharge conveyor 134 is also adapted for side-to-side movement about a vertical axis by operation of one or more additional actuators. Asphalt paving material that falls through chute 130 onto discharge conveyor 134 is discharged through chute 136 at conveyor output end 138 into an asphalt receiving hopper of an asphalt paving machine (not shown). Hydraulic drive systems including hydraulic pumps and hydraulic motors are provided to drive the various augers and conveyors. Engine 140 provides the motive force for the hydraulic pumps that drive the hydraulic motors for the wheel sets, the augers, the various conveyors and the other components of the vehicle.

Engine 140 is contained within engine compartment 142 located beneath discharge conveyor 134.

FIG. 7 illustrates a portion of material transfer vehicle 160, which is substantially similar to material transfer vehicle 110. Material transfer vehicle 160 includes a material-receiving device comprising truck-receiving hopper 180 for receiving asphalt paving material from a delivery truck (not shown). An auger (not shown) is mounted in truck-receiving hopper 180 and is adapted to assist in conveying asphalt paving material from truck-receiving hopper 180 into loading conveyor 182, which is supported at its lower end by a pair of wheel sets, one of which, wheel set 183, is shown in FIG. 7. Loading conveyor 182 conveys the asphalt paving material off of its output end (not shown, but substantially similar to output end 122 of loading conveyor 120 of material transfer vehicle 110) and into a surge bin (also not shown, but substantially similar to surge bin 124 of material transfer vehicle 110). Preferably, the material-receiving device has a width $W_M$ measured transverse to the long axis $A_C$ of loading conveyor 120 that is greater that the width $W_C$ of the loading conveyor (as shown in FIG. 7), so that a recess is provided adjacent to the loading conveyor and behind the material-receiving device.

Ground operator's station 144 is located adjacent to truck-receiving hopper 118 of material transfer vehicle 110 and adjacent to truck-receiving hopper 180 of material transfer vehicle 160. Preferably, the ground operator's station is located in a recess adjacent to the loading conveyor and behind the truck-receiving hopper. Ground operator's station 144 includes lower platform 146, transition support 148, vertical support 149 (shown in FIG. 7) and seat 150 which is attached to seat platform 151. Transition support 149 connects lower platform 146 to vertical support 149, and seat platform 151 is attached to the upper end of vertical support 149. Located directly across from seat 150 is ground operator's control panel 152, which is preferably mounted so that it can pivot or swing from the first position shown in the drawings (which is accessible to a ground operator standing on lower platform 146 or seated on seat 150) to a second position (not shown) which is accessible to a ground operator walking alongside truck-receiving hopper 118 or truck-receiving hopper 180 during a paving operation. Grab bar 154 is located so as to assist the ground operator in climbing onto lower platform 146, and back support 156 (best shown in FIG. 7) is located to provide support for the ground operator's back when seated on seat 150. At least a portion of ground operator's station 144 may be mounted to or attached to wheel set 121 or wheel set 183. Thus, for example, as shown in FIG. 7, seat platform 151 and back support 156 are attached to wheel set 183. Lower platform 146 may also be attached to truck-receiving hopper 118 or truck-receiving hopper 180.

As shown in FIG. 5, ground operator "G" can stand on lower platform 146 and access control panel 152. Alternatively, ground operator "G" can sit on seat 150 as shown in FIG. 6. In either position, the ground operator can see clearly into truck-receiving hopper 118 or truck-receiving hopper 180 and the dump bed of the delivery truck.

As shown in FIG. 7, a plurality of tool support plates 192 are spaced across the top of sidewalls 184 and 186 of truck-receiving hopper 180 to create tool slots 194. Each of these tool slots cooperates with a pair of adjacent tool support plates to allow for secure storage of hand tools such as shovels 196 and 198. In addition, mounted atop loading conveyor 182 adjacent to truck-receiving hopper 180 are tool support walls 200 and 202 that are provided with aligned tool slots 204 which are adapted to support a rod-shaped tool such as cleaning bar 206 across the width of the loading conveyor.

The invention thus provides a material transfer vehicle that includes a ground operator's station. This ground operator's station allows the ground operator to occupy a safe place with respect to the material transfer vehicle and the roadway, yet allows the ground operator to perform all the necessary functions of his job. In addition, the invention provides such a ground operator's station that allows the ground operator to get off his feet for a period of time during the paving operation. Furthermore, a preferred embodiment of the invention provides the ground operator with convenient and safe storage for hand tools such as shovels and cleaning bars.

Although this description contains many specifics, these should not be construed as limiting the scope of the invention but as merely providing illustrations of the presently preferred embodiment thereof, as well as the best mode contemplated by the inventors of carrying out the invention. The invention, as described herein, is susceptible to various modifications and adaptations, as would be understood by those having ordinary skill in the art to which the invention relates.

What is claimed is:

1. A material transfer vehicle comprising:
    a material-receiving device that is adapted to receive asphalt paving material;
    a loading conveyor that is operatively connected to the material-receiving device and adapted to receive asphalt paving material from the material-receiving device;
    a ground operator's station that is located adjacent to the material-receiving device, said ground operator's station comprising:
    a lower platform on which the ground operator may stand;
    a seat on which the ground operator may sit,
    wherein the loading conveyor has a long axis a width $W_C$ that is measured transverse to the long axis,
    wherein the material-receiving device has a width $W_M$ measured transverse to the long axis of the loading conveyor that is greater that the width $W_C$ of the loading conveyor, so that a recess is created adjacent to the loading conveyor and behind the material-receiving device, and
    wherein the ground operator's station is located in the recess adjacent to the loading conveyor and behind the material-receiving device.

2. The material transfer vehicle of claim 1 wherein the ground operator's station further comprises:
    a vertical support;
    a transition support which connects the lower platform to the vertical support;
    a seat platform on which the seat is mounted, which seat platform is attached to the upper end of the vertical support.

3. The material transfer vehicle of claim 1 which includes a ground operator's control panel that is mounted across from the seat, said ground operator's control panel being adapted to pivot or swing from a first position which is accessible to a ground operator standing on the lower platform or seated on the seat to a second position which is accessible to a ground operator walking alongside the material-receiving device.

4. The material transfer vehicle of claim 1 wherein:
    the loading conveyor is supported at its lower end by a wheel set;

at least a portion of the ground operator's station is attached to the wheel set supporting the lower end of the loading conveyor.

5. The material transfer vehicle of claim 1 wherein the ground operator's station further comprises:
a grab bar that is adapted to assist the ground operator to climb onto the lower platform;
a back support that is adapted to provide support for the ground operator's back when seated on the seat.

6. The material transfer vehicle of claim 1 wherein the lower platform of the ground operator's station is attached to the material-receiving device.

7. The material transfer vehicle of claim 1:
wherein the material-receiving device includes a sidewall;
which includes a plurality of tool support plates that are spaced across the top of the sidewall of the material-receiving device to create at least one tool slot between a pair of adjacent tool support plates, which tool slot cooperates with the tool support plates to allow for secure storage of a hand tool.

8. The material transfer vehicle of claim 1 which includes a pair of tool support walls mounted atop the loading conveyor, which tool support walls include aligned tool slots that are adapted to support a rod-shaped tool across the width of the loading conveyor.

* * * * *